United States Patent [19]

Riesenfeld

[11] 3,970,744

[45] July 20, 1976

[54] PROCESS FOR THE PRODUCTION OF SULFUR FROM SULFUR DIOXIDE EXTRACTED FROM GAS STREAMS

[75] Inventor: Fred C. Riesenfeld, Los Angeles, Calif.

[73] Assignee: Ralph M. Parsons Company, Pasadena, Calif.

[22] Filed: Nov. 7, 1974

[21] Appl. No.: 521,834

[52] U.S. Cl.............................. 423/574 R; 423/564
[51] Int. Cl.$^2$......................................... C01B 17/04
[58] Field of Search ........... 423/242, 243, 574, 575, 423/576; 55/73

[56] References Cited
UNITED STATES PATENTS

| | | | |
|---|---|---|---|
| 1,967,263 | 7/1934 | Rosenstein | 423/569 X |
| 2,729,543 | 1/1956 | Keller | 423/575 |
| 3,495,941 | 2/1970 | Van Helden | 423/570 X |
| 3,703,366 | 11/1972 | Cullom | 423/574 |
| 3,764,665 | 10/1973 | Groendaal | 423/574 |

*Primary Examiner*—G. O. Peters
*Attorney, Agent, or Firm*—Christie, Parker & Hale

[57] ABSTRACT

A sulfur dioxide containing gas stream is purified by passage through an absorber containing an aqueous absorption solution for sulfur dioxide. Sulfur dioxide-laden aqueous absorption solution is continuously removed from the absorber. Approximately one-third is passed to a sulfur production zone. The balance of the solution is passed to a sulfur dioxide stripping zone where the sulfur dioxide is separated from the absorption solution which is returned to the absorber. The extracted sulfur dioxide is catalytically hydrogenated to hydrogen sulfide which is passed to the sulfur production zone for reaction with sulfur dioxide to form elemental sulfur. After the formation of elemental sulfur, the balance of the aqueous absorption solution essentially free of sulfur dioxide is returned to the absorber.

8 Claims, 1 Drawing Figure

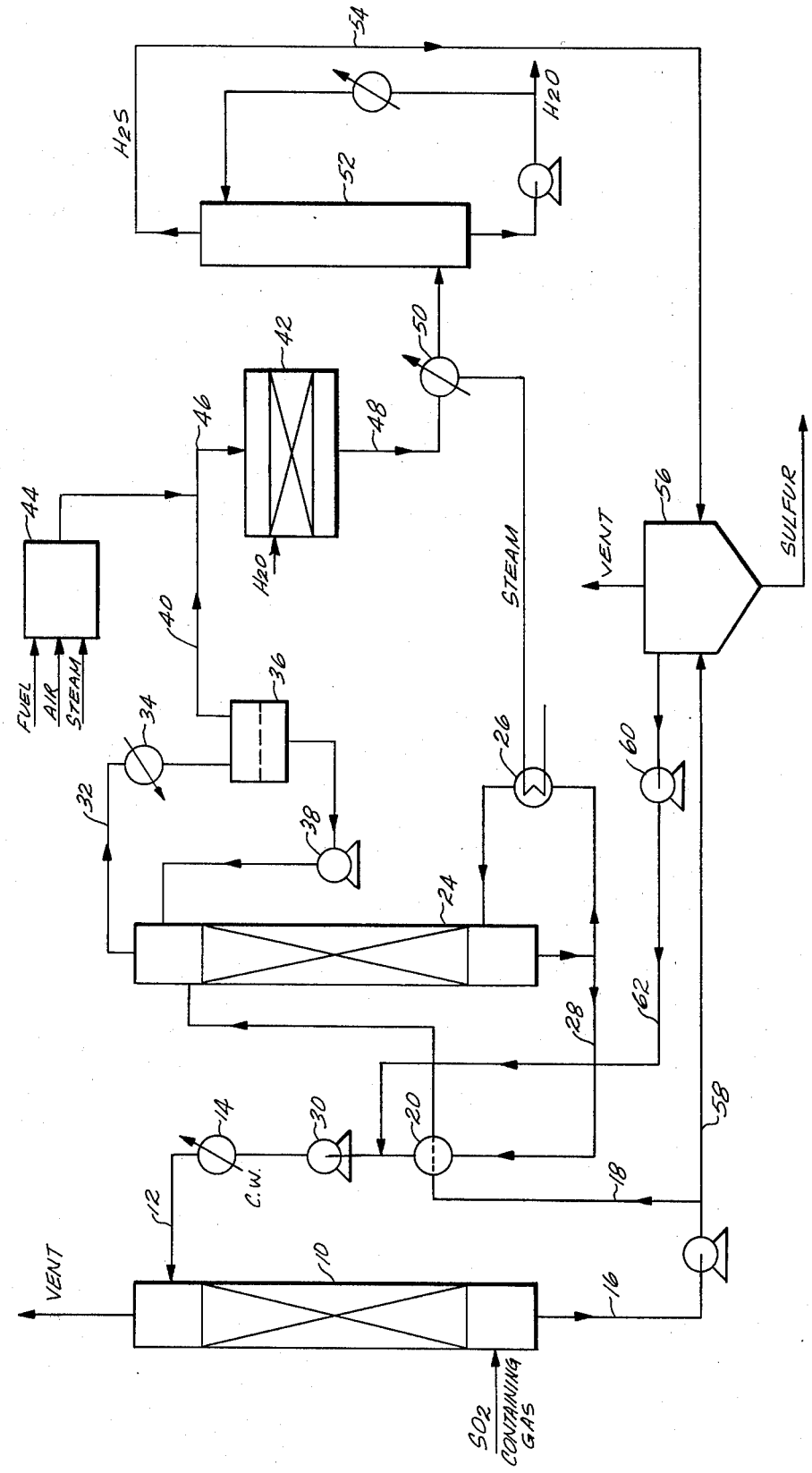

PROCESS FOR THE PRODUCTION OF SULFUR FROM SULFUR DIOXIDE EXTRACTED FROM GAS STREAMS

BACKGROUND OF THE INVENTION

The present invention is related to processes which utilize heat regenerable liquids for the removal of sulfur dioxide from gas streams and to the production of elemental sulfur from sulfur dioxide extracted from gas streams.

Many processes employ aqueous solutions of ammonia, alkaline salts of organic and inorganic acids, and aromatic amines as absorbents for the extraction of sulfur dioxide from gas streams. These solutions are readily stripped of sulfur dioxide upon the application of heat and therefore regenerated for reuse. The stripped sulfur dioxide is processed for the production of liquid sulfur dioxide, sulfuric acid or elemental sulfur.

To produce elemental sulfur from the recovered sulfur dioxide, it is expedient to react the sulfur dioxide with hydrogen sulfide by the Claus reaction. This requires two moles of hydrogen sulfide for each mole of sulfur dioxide.

In a situation where a source of hydrogen sulfide is not available as, for example, in a power plant where sulfur dioxide must be removed from stack exhaust gases, hydrogen sulfide has to be generated if sulfur is to be produced.

This may be accomplished by converting two thirds of the stripped sulfur dioxide to hydrogen sulfide and reacting the balance with the formed hydrogen sulfide over an alumina catalyst in the catalytic zone of a typical Claus plant.

Another possibility, which has been proposed for the regeneration step of the Citrate process, is to produce hydrogen sulfide by reduction of elemental sulfur generated in the process for reaction with sulfur dioxide dissolved in the citrate solution.

Known methods of producing hydrogen sulfide from elemental sulfur have been described, for instance, in "Canadian Mining and Metallurgical Bulletin", Oct. 1957, p. 614 and following, and "Mining Engineering", Jan. 1970, p. 75 and following.

The former process involves non-catalytic direct reaction of hydrogen with sulfur to form hydrogen sulfide at temperatures from 820° to 1000°F. An admitted deficiency in the process is that the reaction products, i.e., a mixture of unreacted sulfur and hydrogen sulfide, are highly corrosive. Type 316 stainless steel, for instance, suffers severe corrosion. In addition, hydrogen of high purity is required for the process and this is expensive.

The process described in the latter publication involves two conversion stages. In the first, sulfur is reacted with a hydrocarbon, such as methane, at a temperature from 600° to 700°C. over a catalyst to form a mixture of hydrogen sulfide and carbon disulfide. The gas stream is passed to a second stage where, at a temperature of 200° to 300°C, the carbon disulfide reacts with water to form hydrogen sulfide and carbon dioxide. This process also suffers from severe corrosion problems and the net gas stream can contain considerable quantities of carbon-sulfur compounds such as carbonyl sulfide and carbon disulfide.

As it pertains to the operation of the Citrate process, it would be necessary to convert two thirds of the formed sulfur to hydrogen sulfide for reaction with sulfur dioxide in the liquid phase at ambient temperature. This is an expensive operation from an energy conservation standpoint since two-thirds of the product must always be recycled back in the form of hydrogen sulfide. Further, the proposed means to generate hydrogen sulfide from the formed sulfur leaves much to be desired due to the corrosion and pollution problems attendant to the generation of hydrogen sulfide from the elemental sulfur.

SUMMARY OF THE INVENTION

According to the present invention there is provided an improvement to processes where sulfur is to be formed from the sulfur dioxide extracted from gas streams by an aqueous sulfur dioxide absorption solution, such as the Citrate process which employs a buffered aqueous solution of an alkali metal citrate, such as sodium citrate, as the absorbent solution.

In accordance with the practice of the present invention a gas stream containing sulfur dioxide is passed through an absorption zone where sulfur dioxide is extracted by an aqueous sulfur dioxide absorption solution. Aqueous absorption solution laden with sulfur dioxide is continuously separated from the absorption zone and split. Approximately two thirds of the sulfur dioxide rich absorption solution is passed to a sulfur dioxide stripping zone where sulfur dioxide is separated from the aqueous solution. The sulfur dioxide lean absorption solution is recycled back to the absorption zone.

The sulfur dioxide separated from the absorption solution is then catalytically hydrogenated in the presence of a source of hydrogen to hydrogen sulfide. This is preferably accomplished by forming a reducing gas stream by the combustion of a carbonaceous fuel such as methane, in the presence of a source of oxygen, typically air, in a reducing gas generator. This forms a gas stream containing as the principal reductants hydrogen and carbon monoxide. The gaseous products from the reducing gas generator are combined with the sulfur dioxide gas and passed to catalytic conversion zone 42 where at a temperature from about 300° to about 1000°F, preferably from about 500° to about 800°F, the sulfur dioxide reacts with the hydrogen present and the hydrogen formed as a consequence of the reaction of carbon monoxide with water to yield hydrogen sulfide. The catalysts employed are those containing the metals of Group Va, VIa, VIII and the Rare Earth series of the Periodic Table as defined by Mendeleef and published as the "Periodic Chart of the Atoms" by W. N. Welch Manufacturing Company. The metals are preferably supported on conventional supports such as silica, alumina, alumina-silica, and the zeolites. Alumina is preferred. The preferred catalysts are those containing one or more of the metals cobalt, molybdenum, iron, chromium, vanadium, thoria, nickel, tungsten and uranium. A cobalt-molybdate catalyst where the support is alumina is particularly preferred.

In addition to causing the hydrogenation of sulfur dioxide to hydrogen sulfide at the temperatures employed, the catalyst serves to hydrolyze any carbonyl sulfide and carbon disulfide which may be present or formed to hydrogen sulfide. The water required for the hydrogenation and hydrolysis reactions may be provided in the stripped sulfur dioxide gas stream. The hydrogen sulfide gas stream after cooling to remove any water present, is combined with the aqueous solution containing the balance of sulfur dioxide where, in the aqueous phase, the hydrogen sulfide reacts with the sulfur dioxide to form elemental sulfur. The elemental sulfur is collected as product, a gas stream now free of sulfur species vented to the atmosphere and the aqueous absorption solution recycled back to the absorption zone.

In the practice of the process of this invention all of the sulfur dioxide removed from the gas stream in the absorption zone leaves the process as elemental sulfur and no recycle of product sulfur is required for the production of hydrogen sulfide.

An additional advantage of the process is that by using sulfur dioxide stripped from two thirds of the absorption solution as the source of hydrogen sulfide, the proper stoichiometry will always be maintained in the sulfur dioxide production zone regardless of solution loading. This enables ready control over the system and prevents unreacted hydrogen sulfide or sulfur dioxide from being vented to the atmosphere.

THE DRAWING

The attached drawing depicts a flow diagram for carrying out the preferred process of the present invention.

DESCRIPTION

According to the present invention there is provided a process for the production of sulfur from sulfur dioxide absorbed in aqueous absorption solutions. Typical of the absorption solutions are aqueous solutions of ammonia, alkaline salts of inorganic and organic acids and certain aromatic amines which are capable of absorbing sulfur dioxide at ambient temperature and releasing the absorbed sulfur dioxide upon the application of heat. The preferred absorbent is an aqueous solution of an alkali metal citrate such as sodium citrate.

With reference to the Drawing, the sulfur dioxide containing gas is passed through sulfur dioxide absorption zone 10, where it is brought into counter current contact with a lean sulfur dioxide absorption solution entering absorption tower 10 in line 12 after being cooled in heat exchanger 14 to maximize the absorption capacity of the solution. The gas stream free of sulfur dioxide is vented to the atmosphere.

The sulfur dioxide-rich absorption solution is withdrawn from the base of absorption tower 10 in line 16 and split. About two thirds of the solution is passed by line 18 after undergoing indirect heat exchange with recycled lean solution in heat exchanger 20 to a sulfur dioxide stripping tower 24. In sulfur dioxide stripper 24 the aqueous absorption solution is heated to a temperature which will enable the solution to effectively desorb the contained sulfur dioxide. The heat required to heat the solution may be provided by indirect heat supplied through reboiler 26.

The lean sulfur dioxide absorption solution is passed by line 28 through heat exchanger 40 and by pump 30 through heat exchanger 14 and back to absorption tower 10.

The sulfur dioxide separated from the absorption solution is passed by line 32 through cooler 34 which enables water vapor and droplets of vaporized absorption solution to cool and coalesce in condenser 36 for recycle by pump 38 back to stripping tower 24.

The sulfur dioxide gas stream which is substantially free of absorption solution but which still contains some water, is passed by line 40 to catalytic converter 42.

Simultaneously there is formed a reducing gas in generator 44. The reducing gas is formed by the partial combustion of a carbonaceous fuel such as methane, propane, butane and the like, in the presence of a source of oxygen, typically air. Steam may be introduced to suppress the formation of soot and carbon-sulfur compounds. The gas stream exiting reducing gas generator 44 comprises as principal reductants, hydrogen and carbon monoxide which serves as a hydrogen doner as it will react with the water in catalysis zone 42 to generate hydrogen for reaction with sulfur dioxide.

The streams are combined and passed by line 46 to catalytic generator 42. Catalytic generator 42 contains one or more beds of a catalyst capable of hydrogenating the sulfur dioxide to hydrogen sulfide. Preferably, the catalyst is also capable of causing hydrolysis of any carbonyl sulfide and carbon disulfide which may be present or formed in the gas stream to hydrogen sulfide and carbon dioxide.

Conversion of the sulfur dioxide to hydrogen sulfide occurs at a temperature of from about 300° to about 1000°F, preferably from about 500° to about 800°F. The catalysts employed are those containing the metals of Group Va, VIa, VIII and the Rare Earth Series of the Periodic Table as defined by Mendeleef and published as the "Periodic Chart of the Atoms" by W. N. Welch Manufacturing Company. The metals are preferably supported on conventional supports such as silica, alumina, alumina-silica, and the zeolites. Alumina is preferred. The most preferred catalysts are those which contain one or more of the metals cobalt, molybdenum, iron, chromium, vanadium, thorea, nickel, tungsten and uranium. A cobalt-molybdate catalyst where the support is alumina is particularly preferred.

Reaction in catalytic converter 42 is highly exothermic. To maintain the temperature within the prescribed range, an external coolant can be employed to absorb the heat of reaction. In the alternative, as shown, there may be injected water as a fine spray into the catalysis zone to quench the reaction and absorb the heat of reaction. Introduced water also serves to hydrolyze any carbonyl sulfide and carbon disulfide present to hydrogen sulfide and to react with carbon monoxide present in the effluent from the reducing gas generator to form hydrogen for reaction with the sulfur dioxide. Another alternative is recycling of a portion of the effluent gas from reactor 56. Under the temperature conditions employed, complete conversion of the sulfur dioxide to hydrogen sulfide is realized.

The hydrogen sulfide gas stream from catalytic converter 42 is passed in line 48 to waste heat generator 50 where heat is generated in the form of steam for use in heating the solution undergoing sulfur dioxide stripping in stripper tower 24, or alternately the hot gas stream may be passed through reboiler 26. The gas stream is then passed to contact cooler 52 where the water present is removed.

Since hydrogenation of sulfur dioxide in converter 42 is complete, the condensate is free of corrosive polythionic and sulfurous acids.

The hydrogen sulfide gas stream is then passed by line 54 to sulfur production zone 56 where it is brought into contact with the balance of the sulfur dioxide rich absorption solution from absorber 10, which is passed to sulfur production zone 56 by line 58.

In sulfur production zone 56, hydrogen sulfide and sulfur dioxide react in the aqueous phase to form elemental sulfur which is withdrawn as product, typically as a slurry. Gases present which are essentially free of sulfur dioxide and hydrogen sulfide are vented to the atmosphere. Upon formation of sulfur, the absorption solution which is rendered lean, is pumped by pump 60 through line 62 back for recycle to absorption tower 10.

In the practice of this invention, all sulfur dioxide removed from the gas stream in the absorber leaves the plant as elemental sulfur and no recycle of product sulfur is required. An additional advantage of the improved process is the fact that by using the sulfur dioxide stripped from two-thirds of the absorbent solution as the source of hydrogen sulfide to react with sulfur dioxide contained in the remaining one-third of the solution, the proper stoichiometry will always be maintained in the reaction tank, regardless of solution loading. This feature permits easy control of the system and prevents unreacted hydrogen sulfide or sulfur dioxide to the atmosphere.

The improved process, with modifications, can be applied to other processes embodying thermal regeneration (and stripping of sulfur dioxide) of a solvent. For example, the rich solution from the bottom of the absorber can be split into two streams, in the ratio of 2:1, and stripped in two separate strippers. The sulfur dioxide obtained from the larger stream can be catalytically converted to hydrogen sulfide as described above. The hydrogen sulfide rich gas, without being cooled, is then combined with the sulfur dioxide stripped from the smaller liquid stream in a sulfur production zone and the mixed gases fed to one or more catalytic Claus stages of the sulfur production zone. Since the source of the hydrogen sulfide and sulfur dioxide is the rich absorbent and the control of the split of the rich solution at a ratio of 2:1 is quite simple, the ratio of hydrogen sulfide to sulfur dioxide entering the Claus stages will always be near optimum resulting in maximum conversion of elemental sulfur.

What is claimed is:

1. A process for the production of sulfur from sulfur dioxide contained in gas streams which comprises:
   a. passing a sulfur dioxide containing gas stream through a sulfur dioxide absorption zone containing an aqueous absorbent for sulfur dioxide to form a sulfur dioxide rich absorbent and a sulfur dioxide lean gaseous stream;
   b. separating the sulfur dioxide rich absorbent from the absorption zone;
   c. passing about one-third of the sulfur dioxide rich absorbent to a sulfur production zone;
   d. passing the balance of the sulfur dioxide rich absorbent to a sulfur dioxide stripping zone to separate sulfur dioxide from the absorbent to form a sulfur dioxide lean absorbent for recycle to the absorption zone;
   e. catalytically hydrogenating the sulfur dioxide separated from the sulfur dioxide rich absorbent in the stripping zone in the presence of a source of hydrogen to hydrogen sulfide at a temperature from about 300° to about 1000°F in the presence of a catalyst consisting of at least one supported metal selected from Group Va, VIa, VIII and the Rare Earth Series of the Periodic Table; and
   f. passing the formed hydrogen sulfide to the sulfur production zone where sulfur is formed from the introduced hydrogen sulfide and sulfur dioxide.

2. A process as claimed in claim 1 in which the sulfur dioxide is hydrogenated to hydrogen sulfide at a temperature from about 500° to about 800°F.

3. A process as claimed in claim 1 in which the catalyst consists of cobalt and molybdenum deposited on alumina.

4. A process as claimed in claim 1 in which the aqueous absorption solution is an aqueous metal citrate solution.

5. A process for the production of sulfur from sulfur dioxide contained in gas streams which comprises:
   a. passing a sulfur dioxide containing gas stream through a sulfur dioxide absorption zone containing an aqueous absorbent for sulfur dioxide to form a sulfur dioxide rich absorbent and a sulfur dioxide lean gaseous stream;
   b. separating the sulfur dioxide rich absorbent from the absorption zone;
   c. stripping sulfur dioxide from about two thirds of the sulfur dioxide rich absorbent to form a sulfur dioxide lean absorbent for recycle to the absorption zone;
   d. catalytically hydrogenating the sulfur dioxide, separated from the sulfur dioxide rich absorbent by stripping, in the presence of a source of hydrogen to hydrogen sulfide at a temperature from about 300° to about 1000°F in the presence of a catalyst consisting of at least one supported metal selected from Group Va, VIa, VIII and the Rare Earth Series of the Periodic Table;
   e. combining the formed hydrogen sulfide and the balance of the sulfur dioxide rich absorbent solution in a sulfur production zone where sulfur is formed by an aqueous phase reaction between hydrogen sulfide and sulfur dioxide to yield a sulfur dioxide lean absorption solution for recycle to the absorption zone.

6. A process as claimed in claim 5 in which the sulfur dioxide is hydrogenated to hydrogen sulfide at a temperature from about 500° to about 800°F.

7. A process as claimed in claim 5 in which the catalyst consists of cobalt and molybdenum deposited on alumina.

8. A process as claimed in claim 5 in which the aqueous absorption solution is an aqueous alkali metal citrate solution.

* * * * *